US011999429B1

(12) United States Patent
Williams

(10) Patent No.: US 11,999,429 B1
(45) Date of Patent: Jun. 4, 2024

(54) APPARATUS FOR ATTACHING A CONTAINER TO A TWO WHEELED VEHICLE

(71) Applicant: Mosko Moto LLC, White Salmon, WA (US)

(72) Inventor: Lee Alexander Williams, White Salmon, WA (US)

(73) Assignee: Mosko Moto LLC, White Salmon, WA (US)

( * ) Notice: Subject to any disclaimer, the term of this patent is extended or adjusted under 35 U.S.C. 154(b) by 0 days.

(21) Appl. No.: 18/141,160

(22) Filed: Apr. 28, 2023

(51) Int. Cl.
 *B62J 9/27* (2020.01)
 *B62J 9/24* (2020.01)

(52) U.S. Cl.
 CPC .. *B62J 9/27* (2020.02); *B62J 9/24* (2020.02)

(58) Field of Classification Search
 CPC ......... B62J 7/04; B62J 9/00; B62J 9/20; B62J 9/23; B62J 9/24; B62J 9/26; B62J 9/27; B62J 7/08; B62J 7/02
 USPC ...................................................... 224/413
 See application file for complete search history.

(56) References Cited

U.S. PATENT DOCUMENTS

| | | | | |
|---|---|---|---|---|
| 6,607,327 B1 * | 8/2003 | Ho | ............................. | B62J 9/24 280/288.4 |
| 2019/0061863 A1 * | 2/2019 | Lee | ........................ | B62M 6/90 |

FOREIGN PATENT DOCUMENTS

| | | | | |
|---|---|---|---|---|
| DE | 19827973 A1 * | 3/2000 | ................ | B62J 7/04 |
| WO | WO-2016046773 A1 * | 3/2016 | ................ | B62J 7/02 |
| WO | WO-2016157135 A1 * | 10/2016 | ................ | B62J 7/04 |
| WO | WO-2019026046 A1 * | 2/2019 | ................ | B62J 7/02 |

OTHER PUBLICATIONS

DE-19827973-A1 Translation, Flammann N, Mar. 2000 (Year: 2000).*

* cited by examiner

*Primary Examiner* — Nathan J Newhouse
*Assistant Examiner* — Matthew T Theis
(74) *Attorney, Agent, or Firm* — John W. Branch; Branch Partners PLLC

(57) ABSTRACT

A bracket for quickly and securely attaching and un-attaching a container to a two wheeled vehicle under a wide range of environments and operating conditions. One planar side of the bracket is fastened to the container, and an opposite planar side of the bracket includes a plurality of attachment devices to attach and un-attach the bracket to a chassis bracket that is separately fastened to a chassis of the two wheeled vehicle.

20 Claims, 20 Drawing Sheets

APPARATUS FOR ATTACHING A CONTAINER TO A TWO WHEELED VEHICLE

TECHNICAL FIELD

The embodiments relate generally to attachment brackets and, more specifically, to baggage, or luggage brackets adapted for attachment to two wheeled vehicles.

BACKGROUND

Two wheeled vehicles are convenient and fun vehicles for open air touring in remote locations. However, one of the drawbacks of two wheeled vehicle touring is the relatively small amount of space available to carry extra clothing, food, spare parts, camping equipment, tools, or the like. Consequently, touring two wheeled vehicles, such as motorcycles, often include additional containers, such as hard luggage and/or soft bags for carrying extra items. Typically, these containers can be mounted on brackets such as racks that are permanently fastened to the frame of a two wheeled vehicle, e.g., behind the rider's seat, on top of the vehicle, and/or on one side or opposite sides of the rear portion of the vehicle.

The side fastening of containers to brackets permanently attached to the rear portion of a two wheeled vehicle's frame provides some benefits. For example, the amount of effort to manually move a motorcycle with full containers may be mitigated because the center of gravity of the vehicle remains low and in line with a motorcycle engine mounted to a front portion of the motorcycle's frame.

However, a system that reliably provides a user of a two wheeled vehicle with a fast and secure way to attach and un-attach containers to opposite sides of the vehicle under widely varying environmental, atmospheric, and operating conditions has remained elusive.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE INVENTION

Figure 1A:
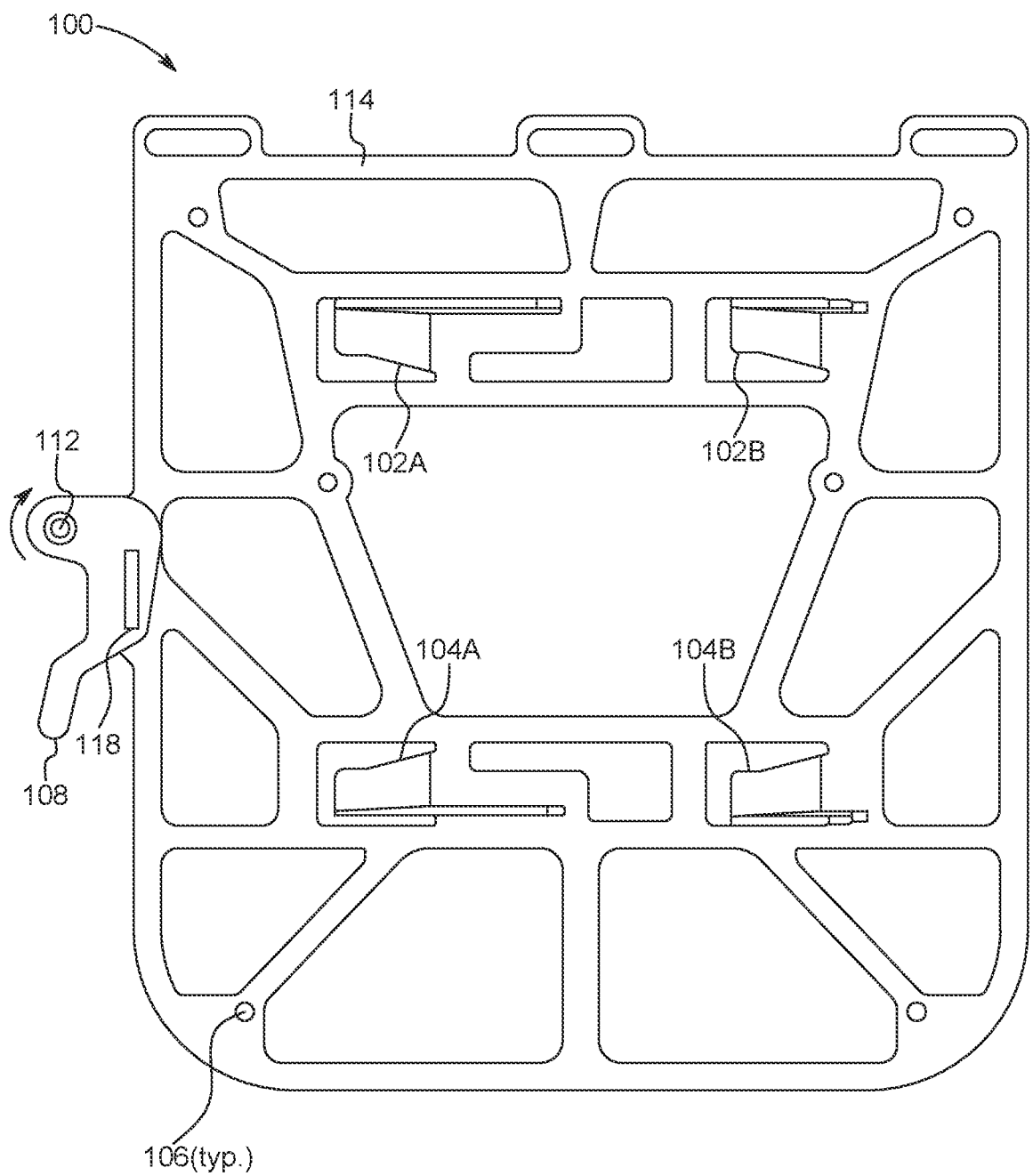
FIG. 1A shows a planar view of a front side of a container bracket with ports configured for permanent attachment to a container and multiple ramp shaped elements of attachment devices that are adapted for engaging a chassis bracket on a side of a two wheeled vehicle.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "two wheeled vehicle" refers to a motorcycle, moped, scooter, electric bicycle, bicycle, personal electric transporter, or a three wheeled vehicle.

As used herein the term, "container" refers to a bag, case, box, or pannier. In one or more embodiments, a container may be formed with soft, hard or hybrid materials. Further, the container's materials may include one or more of fabric, leather, flexible plastic, hard plastic, fiberglass, carbon fiber, alloy metal, steel, aluminum, or the like.

As used herein the term, "container bracket" refers to a relatively rectangular planar frame that is configured to fasten one planar surface to a container and further configured to temporarily attach and un-attach the opposite planar surface of the mounting bracket to a two wheeled vehicle.

In one or more embodiments, the container bracket may be configured with a plurality of ports that are configured for a plurality of fastener devices to fasten one planar side of the container bracket to a container. In one or more embodiments, the plurality of ports are configured in different positions to distribute one or more external rotational, vertical and/or horizontal forces across the fastener devices that fasten the one planar side of the container bracket to the container. In one or more embodiments, the fastener devices may include one or more of a bolt, rivet, screw, stud, peg, button, snap, tack, latch, clip, clasp, peg, pinion, clamp, anchor, tape, staple, tether, tie, chain, shackle, hook and loop fastener, adhesive, weld, or the like.

In one or more embodiments, the opposite planar side of the container bracket (opposite of the planar side fastened to the container) may be configured with a plurality of attachment devices to quickly attach and un-attach the container bracket to a chassis bracket such as a rack, or luggage bracket that is connected to one or more chassis elements for a two wheeled vehicle. Exemplary chassis elements may include one or more of a frame, post, strut, or the like of the two wheeled vehicle. In one or more embodiments, one or more of the plurality of attachment devices may also be configured to quickly attach and un-attach directly to one or more chassis elements of the two wheeled vehicle.

The following briefly describes various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a container bracket for quickly and securely attaching and un-attaching a container to a two wheeled vehicle under a wide range of environments and operating conditions. One planar side of the container bracket is fastened to the container, and an opposite planar side of the container bracket includes a plurality of attachment devices to facilitate quickly and easily attaching and un-attaching the container bracket to a chassis bracket that is separately fastened to a chassis of a two wheeled vehicle.

In one or more embodiments, different configurations of a container bracket may be provided to accommodate differently shaped chassis brackets fastened to different sides of a two wheeled vehicle. For example, one side of the two wheeled vehicle may be fastened to a type of chassis bracket that is shaped to accommodate one or more chassis elements such as a frame or an exhaust pipe of the vehicle that extends the chassis bracket further away from the one side of the vehicle than a shape of another chassis bracket shaped to accommodate other chassis elements on an opposite side of the vehicle. In this scenario, two differently shaped configurations of the container bracket may be provided to accommodate for potential interferences with the two differently shaped chassis brackets fastened to opposite sides of the same two wheeled vehicle.

Additionally, in one or more embodiments another chassis bracket may be separately provided by a third party. Although a configuration of a third party chassis may be originally arranged to attach to a different container and/or another container bracket provided by one or more third parties, the novel attachment devices of the various embodiments of the instant container bracket may be initially configured and/or adjustably configured (not shown) to removably attach to a wide variety of a plurality of components on different type of other chassis brackets separately provided by third parties.

In one or more embodiments, the container bracket may be configured with a plurality of ports that are each configured for one or more types of fastener devices to permanently, or semi-permanently fasten a surface of one planar side of the container bracket directly to a corresponding container. Also, in one or more embodiments, the container bracket may be configured to permanently, or semi-permanently fasten a surface of one planar side of the container bracket directly to two or more corresponding containers. Also, in one or more embodiments, the container bracket may be configured to attach/un-attach directly to the vehicle's chassis.

In one or more embodiments, the plurality of attachment devices and the plurality of fastener devices configured for the plurality of ports may be positioned in an arrangement on internal sections of the container bracket to distribute weight of the container and one or more externally applied forces, e.g., rotational, vertical and/or horizontal forces that can occur during normal operation of the two wheeled vehicle or an unexpected event. For example, externally applied forces may unexpectedly occur when the two wheeled vehicle: falls over on one side while stationary or moving, collides with a stationary object while moving, or collides with another moving vehicle while stationary or moving.

Also, in one or more embodiments, one or more portions of the container bracket may be comprised of one or more types of material that retain a shape memory of the container bracket when an external force changes an original shape of the container bracket into a new shape. In this way, the one or more portions of the container bracket comprised of shape memory material can be returned automatically, or manually, to the original shape of the one or more portions after the external force is removed. In one or more embodiments, one or more portions of the container bracket may be comprised of one or more of metallic materials or non-metallic materials that may have a differing, or no, amount of shape memory retention, e.g., steel, alloy metal, aluminum, nitinol, fiberglass, polymers, plastics, carbon fiber, composite materials, or the like. In one or more embodiments, a benefit of using a shape memory material in one or more portions of the container bracket may be reduced weight and reusability of the container bracket even after an externally applied force has caused a significant change in the original shape of the one or more portions of the container bracket.

Also, in one or more embodiments, the plurality of attachment devices configured for the container brackets may be configured to engage a plurality of components of a chassis bracket and/or chassis elements on the two wheeled vehicle. Further, in one or more embodiments, the plurality of attachment devices may include one or more of ramp shaped elements, hook shaped elements, or contour shaped elements for engaging with the plurality of components of the chassis bracket.

For example, in one or more embodiments, a sliding movement of the container bracket towards the rear of the vehicle and along the chassis bracket attached to a side of the two wheeled vehicle can enable one or more elements, e.g., the ramp shaped elements, of the attachment devices to progressively apply a wedging force against one or more adjacent/corresponding components of the chassis bracket.

Additionally, in one or more embodiments, a sliding movement of the container bracket towards the rear of the vehicle may be caused by activation of one or more engagement devices fastened to the container bracket and positioned against one or more portions of the chassis bracket. For example, in one or more embodiments, when the container bracket is attached to the right side of the two wheeled vehicle, manual clockwise rotation of the one or more engagement devices, such as a cam shaped lever, may be configured to progressively apply a horizontal/latitudinal rearward movement of the container bracket against the chassis bracket that is fastened to one side (right side) of a two wheeled vehicle. Further, the manual clockwise rotation of the exemplary cam lever may be configured to cause progressive application of a wedging force by a plurality of ramp shaped elements of attachment devices to a plurality of components of the chassis bracket to attach the container bracket to the chassis bracket that is fastened to the right side of the two wheeled vehicle.

Also, counter-clockwise rotation of the exemplary cam shaped lever may be configured to apply a horizontal/latitudinal forward sliding force on the container bracket against the chassis bracket. And the counter-clockwise rotation of the cam lever may be configured to cause progressive release of a wedging force applied to the plurality of components of the chassis bracket by the ramp shaped elements of attachment devices so that the container bracket is un-attached to the chassis bracket fastened to the right side of the vehicle.

Similarly, when the one or more engagement devices for the container bracket are arranged for attachment to the chassis bracket fastened on the left side of the two wheeled vehicle, the one or more left side engagement devices may be configured to rotate in a reverse direction to perform the same functions as caused by the rotation direction of the right side engagement devices. For example, manual clockwise rotation of a cam lever may be configured to cause progressive release/un-attachment of the container bracket and counter-clockwise rotation of the cam lever may be configured to cause progressive attachment of the container bracket to the chassis bracket that is fastened to the left side of the two wheeled vehicle.

Although not shown, in one or more embodiments, one or more other engagement devices may be configured to rotate in the clockwise and counter-clockwise directions to apply one or more vertical or diagonal forces to slide another container bracket generally upward (or generally downward) along another chassis bracket. Further, a plurality of other attachment devices may be arranged on the other container bracket to engage a plurality of other components of the other chassis bracket and/or other chassis elements on a side of the two wheeled vehicle. Also, the one or more engagement devices may be configured to progressively apply or release the one or more vertical or diagonal forces.

Moreover, although not shown, in one or more embodiments, the one or more other engagement devices may be configured to apply one or more of a downward vertical force or a downward diagonal force to attach the other container bracket to the other chassis bracket. Further, in one or more embodiments, the one or more engagement devices may be configured to apply one or more of an upward vertical force or an upward diagonal force to un-attach the other container from the other chassis bracket. Also, in one or more embodiments, plurality of other attachment components of another container bracket may include one or more of ram shaped components, hooks, or contour shaped components for engaging a plurality of other components of another chassis bracket. The downward, upward, front/forward, rear/rearward directions are oriented in relation to a top, bottom, front, and rear, of the two wheeled vehicle.

Alternatively, although not shown, in one or more embodiments, the one or more of a vertical force or a diagonal force may be applied upward to attach the other container bracket to the other chassis bracket. Further, in one or more embodiments, the one or more of the vertical force or the diagonal force may be applied downward to un-attach the other container bracket from the other chassis bracket.

Moreover, in one or more embodiments not shown, different portions of a plurality of attachment components for a container bracket may be configured to attach horizontally, diagonally, and/or vertically to different portions of a plurality of components of the chassis bracket. Furthermore, in one or more embodiments, one or more engagement devices may be configured to separately or in combination apply one or more of a vertical force, a diagonal force, or a horizontal force.

Also, in one or more embodiments, one or more of a fixed position and/or activation, e.g., rotate and/or counter-rotate, for the engagement device may be controlled by a security device. The security device may include one or more of a mechanical, electro-mechanical or electronic device. Mechanical security devices may include lock, keyed lock, pin, bolt, detent, bracket, spring, coil, cam, lever, handle, clasp, washer, hydraulic component, air component or the like. Electro-mechanical or electronic security devices may include one or more wired interfaces comprising a motor, solenoid, actuator, push button, keypad, biometric sensor, video camera, or the like. Further, in one or more embodiments, one or more wireless interfaces for the security devices may comprise a Bluetooth™ component, Bluetooth Low Energy™ (BLE) component, ANT™ component, Radio-frequency identification (RFID™) component, near-field communication (NFC™) component, WiFi™ component, or the like. Moreover, in one or more embodiments, the rotation and counter rotation of the engagement device may be caused by one or more of manual, mechanical, or electrical activation. For example, the activation and/or de-activation of the engagement device may be controlled locally by one or more of mechanical devices, wired electro-mechanical or wired electronic devices. Further, the activation and/or de-activation may be controlled remotely with one or more wireless interfaces for the electronic security devices, and/or electro-mechanical security devices. Also, in one or more embodiments, electrical power to energize the electronic or electro-mechanical security devices may be provided by a battery and/or an electrical system of the two wheeled vehicle. Further, a coupling of the electronic or electro-mechanical security devices to the electrical system of the two wheeled vehicle may be provided by one or more of wireless electrical induction components or wired cable components.

Additionally, one benefit of the various embodiments may be found during an acceleration of a two wheeled vehicle in the forward direction, which may cause a significant rearward force on the container bracket that serves to further increase a wedging force horizontally applied by the plurality of attachment devices attached to components of a chassis bracket fastened to the vehicle. Also, another benefit of the various embodiments may occur when the two wheeled vehicle has fallen over on its side onto the ground and continues sliding for some distance. In this scenario, the slide induced friction on a container may cause a significant rearward force on the container bracket that may also serve to further increase the wedging force horizontally applied by the plurality of attachment devices attached to components of a chassis bracket. Consequently, a container attached by the container bracket to a two wheeled vehicle may be less likely to unintentionally detach when the two wheeled vehicle is rapidly accelerating, tipped over on its side, or sliding on its side for a distance on the ground or a road.

Illustrative Architecture

FIG. 1A shows planar front view 100 of one embodiment of a container bracket that includes a rectilinear shaped frame 114 having a plurality of internal sections and ports 106 that are formed during a manufacturing process that removes a plurality of pieces of the material that forms the rectilinear shape of the frame. Also, the arrangement of the plurality of sections are positioned to evenly distribute the weight of a container (fastened to the internal sections) and one or more externally applied forces, e.g., rotational, vertical and/or horizontal forces that can occur during normal operation of the two wheeled vehicle or an unexpected event. Further, a plurality of ports 106 are arranged on a portion of the plurality of internal sections. Although not shown, a plurality of fastening devices may use the plurality of ports to fasten a container (not shown) to a plurality of internal sections of the container bracket.

Upper ramp shaped elements of attachment devices 102A and 102B are arranged to provide for removable attachment and un-attachment of the container bracket to a chassis bracket (not shown) that is adapted for attachment to a side of a two wheeled vehicle.

Lower ramp shaped elements of attachment devices 104A and 104B are arranged to provide for removable attachment and un-attachment of the container bracket to a chassis bracket (not shown) that is adapted for attachment to a side of a two wheeled vehicle. Also, the lower and or upper attachment devices may be initially configured and/or adjustably configured (not shown) to removably attach to a wide variety of a plurality of components on different chassis brackets separately provided by third parties.

Cam shaped lever 108 is configured to rotate around axle 112. Also, security device 118 is arranged to control clockwise rotation and/or counter-clockwise rotation of cam lever 108 around axle 112. Security device 118 may include one or more of a lock, keyed lock, pin, bolt, detent, bracket, spring, clasp, handle, washer, or the like.

Figure 1B:
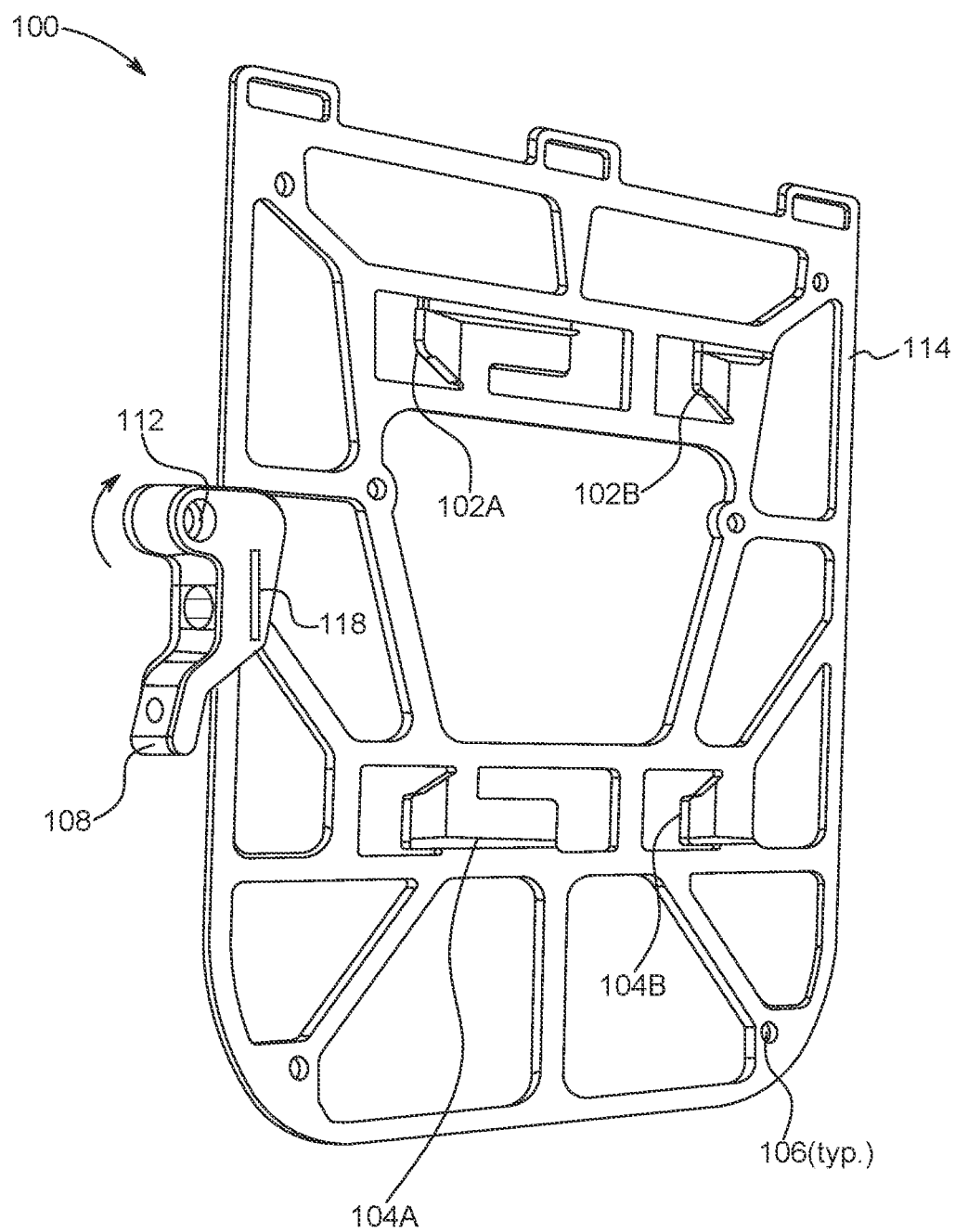
FIG. 1B illustrates a perspective view of the front planar view of the container bracket shown in FIG. 1A

FIG. 1B illustrates perspective front view 110 of the container bracket shown in FIG. 1A. As shown, cam lever 108 is arranged to rotate clockwise and counter-clockwise around axle 112. Security device 118 is arranged to control clockwise rotation and/or counter-clockwise rotation of cam lever 108 around axle 112. Also, ports 106 are arranged on a portion of the plurality of internal sections to enable a plurality of fastening devices to fasten a container (not shown) to the container bracket. Further, the front side of upper ramp shaped elements of attachment devices 102A and 102B and lower ramp shaped elements of attachment devices 104A and 104B are shown.

Figure 1C:
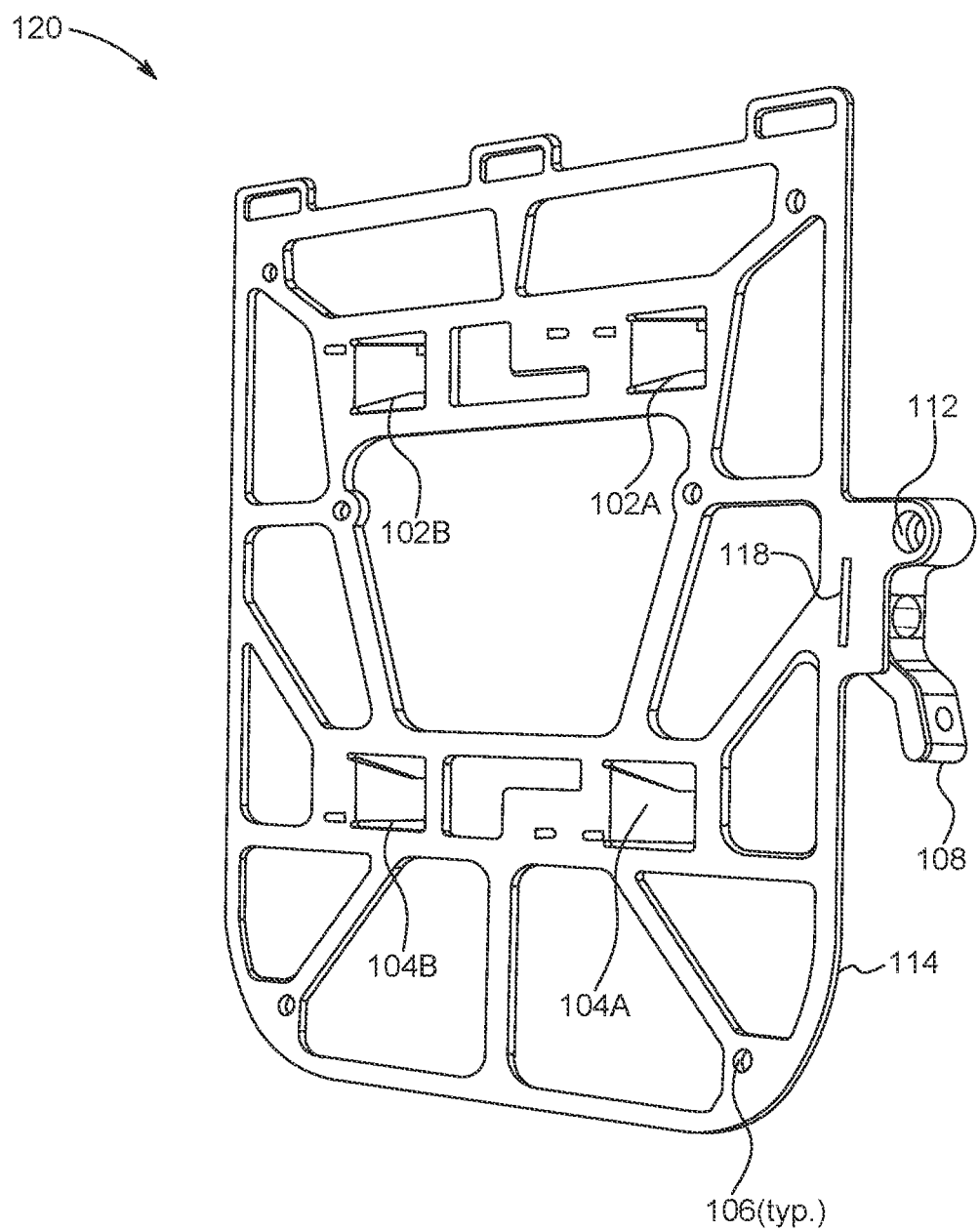
FIG. 1C shows a perspective view of a rear side of the container bracket shown in FIG. 1A.

FIG. 1C shows perspective rear view 120 of the container bracket shown in FIG. 1A. As shown, cam lever 108 is arranged to rotate clockwise and counter-clockwise around axle 112. Security device 118 is arranged to control clockwise rotation and/or counter-clockwise rotation of cam lever 108 around axle 112. Also, ports 106 are arranged on a portion of the plurality of internal sections to enable a plurality of fastening devices to fasten a container (not shown) to the container bracket. Further, the front side of upper ramp shaped elements of attachment devices 102A and 102B and lower ramp shaped elements of attachment devices 104A and 104B are shown.

Figure 1D:
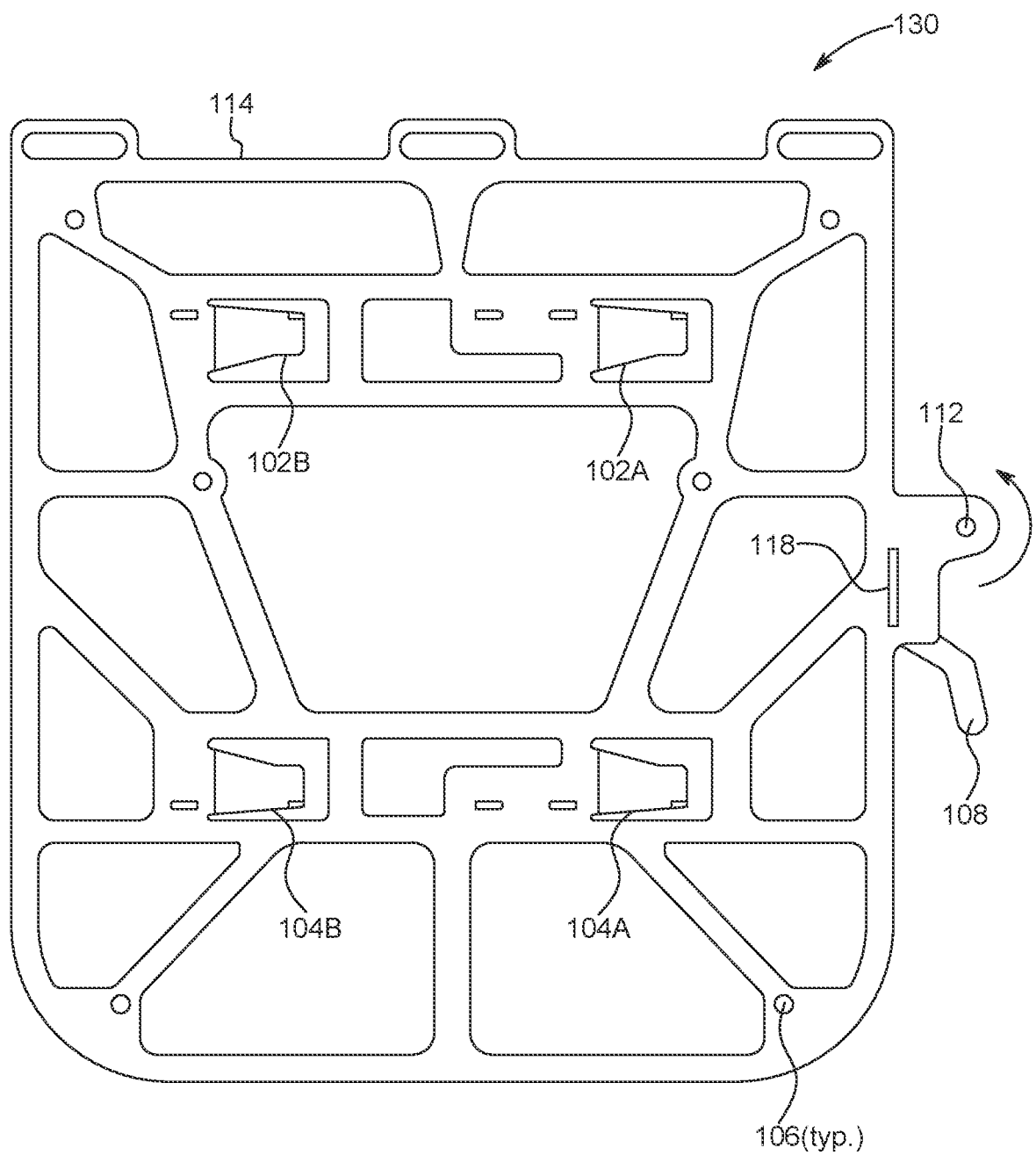
FIG. 1D illustrates a planar view of the rear side of the container bracket shown in FIG. 1A.

FIG. 1D illustrates planar rear view 130 of the container bracket shown in FIG. 1A. As shown, cam lever 108 is arranged to rotate clockwise and counter-clockwise around axle 112. Security device 118 is arranged to control clockwise rotation and/or counter-clockwise rotation of cam lever 108 around axle 112. Also, ports 106 are arranged on a portion of the plurality of internal sections to enable a plurality of fastening devices to fasten a container (not shown) to the container bracket. Further, the rear side of upper ramp shaped elements of attachment devices 102A and 102B and lower ramp shaped elements of attachment devices 104A and 104B are shown.

Figure 1E:
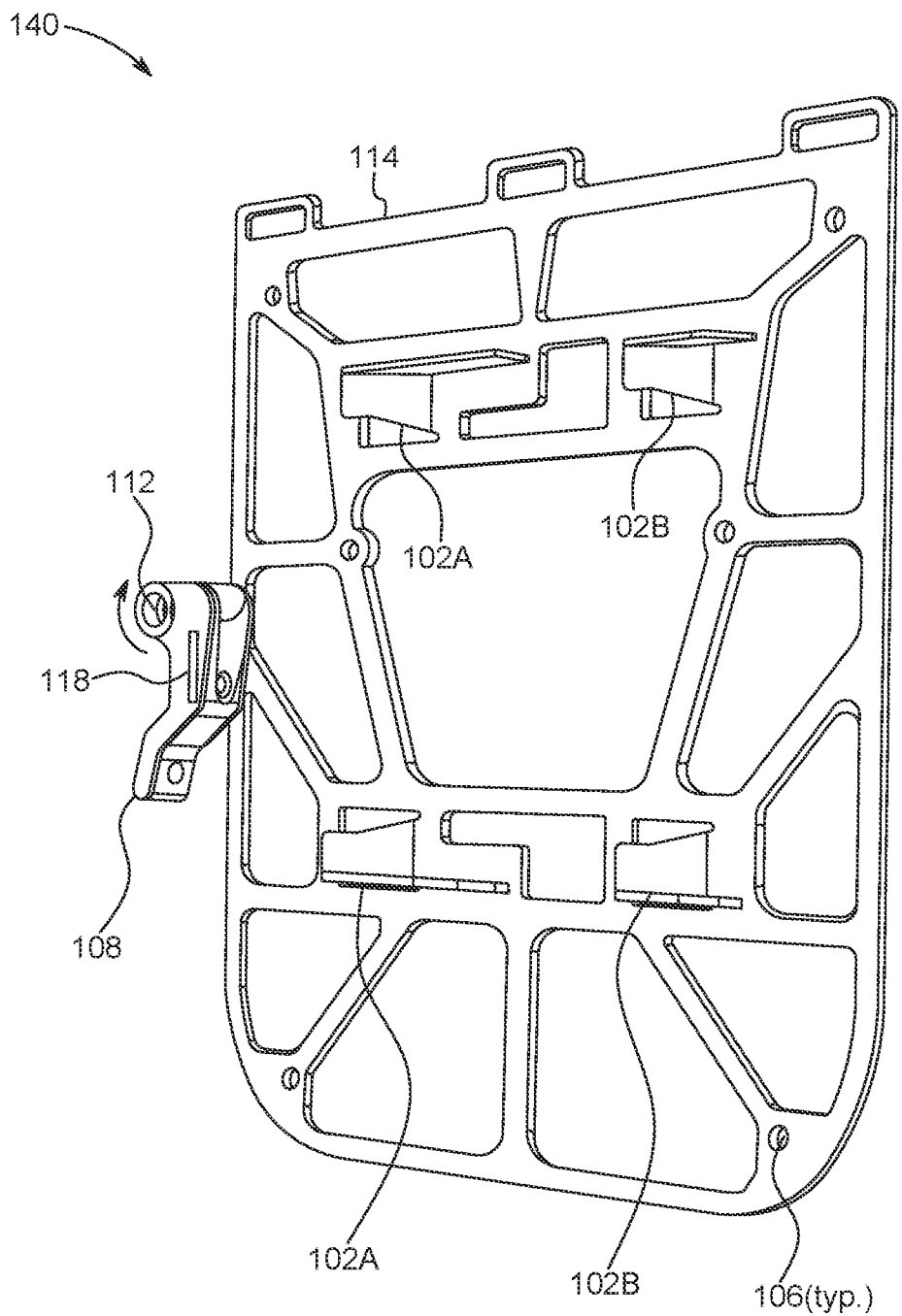
FIG. 1E shows another perspective view of the front planar view of the container bracket shown in FIG. 1A.

FIG. 1E shows another perspective front view 140 of the container bracket shown in FIG. 1A. As shown, cam lever 108 (engagement device) is arranged to rotate clockwise and counter-clockwise around axle 112. Security device 118 is arranged to control clockwise rotation and/or counter-clockwise rotation of cam lever 108 around axle 112. Also, ports 106 are arranged on a portion of the plurality of internal sections to enable a plurality of fastening devices to fasten a container (not shown) to the container bracket. Further, the front side of upper ramp shaped elements of attachment devices 102A and 102B and lower ramp shaped elements of attachment devices 104A and 104B are shown.

Figure 2A:
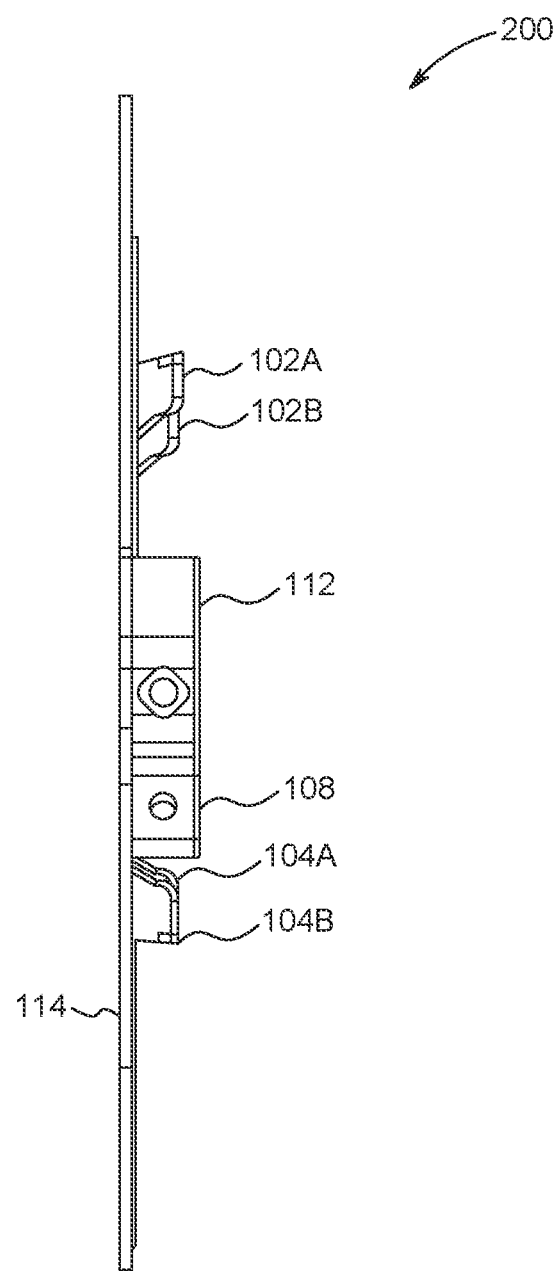
FIG. 2A illustrates a side view of the container bracket shown in FIG. 1A.

FIG. 2A illustrates side view 200 of the container bracket shown in FIG. 1A. As shown, cam lever 108 is arranged to rotate clockwise and counter-clockwise around axle 112. Further, the sides of upper ramp shaped elements of attachment devices 102A and 102B and lower ramp shaped elements of attachment devices 104A and 104B are shown.

Figure 2B:
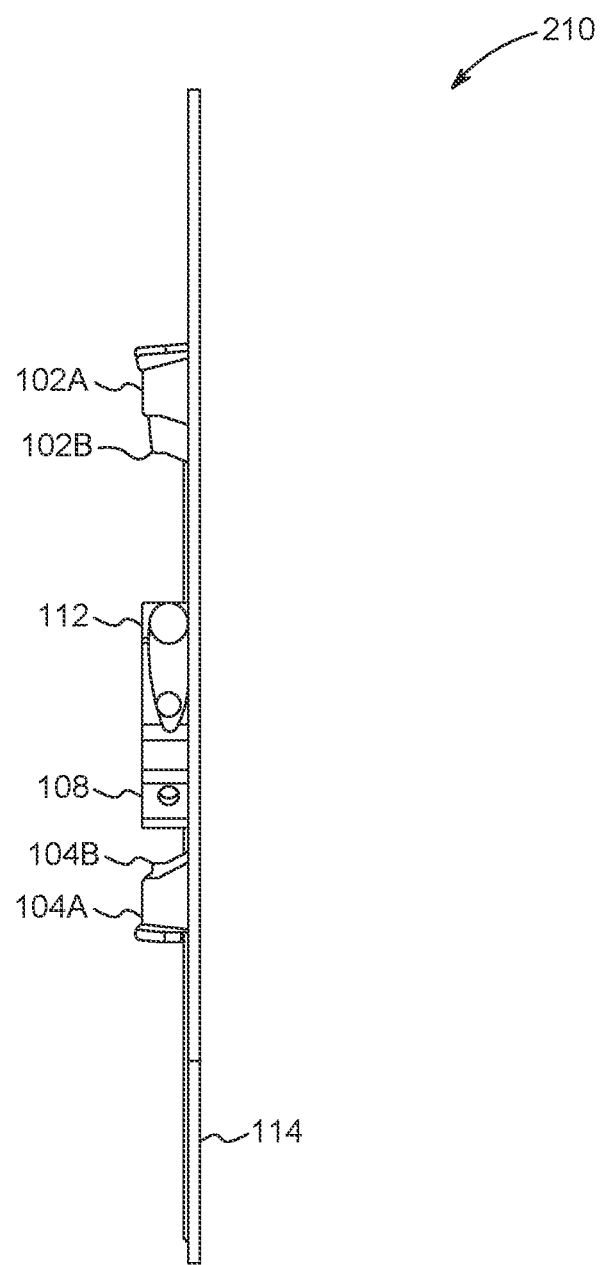
FIG. 2B shows a reversed side view of the container bracket shown in FIG. 1A.

FIG. 2B shows another side view 210 of the container bracket shown in FIG. 1A. As shown, cam lever 108 is arranged to rotate clockwise and counter-clockwise around axle 112. Further, the sides of upper ramp shaped elements of attachment devices 102A and 102B and lower ramp shaped elements of attachment devices 104A and 104B are shown.

Figure 2C:
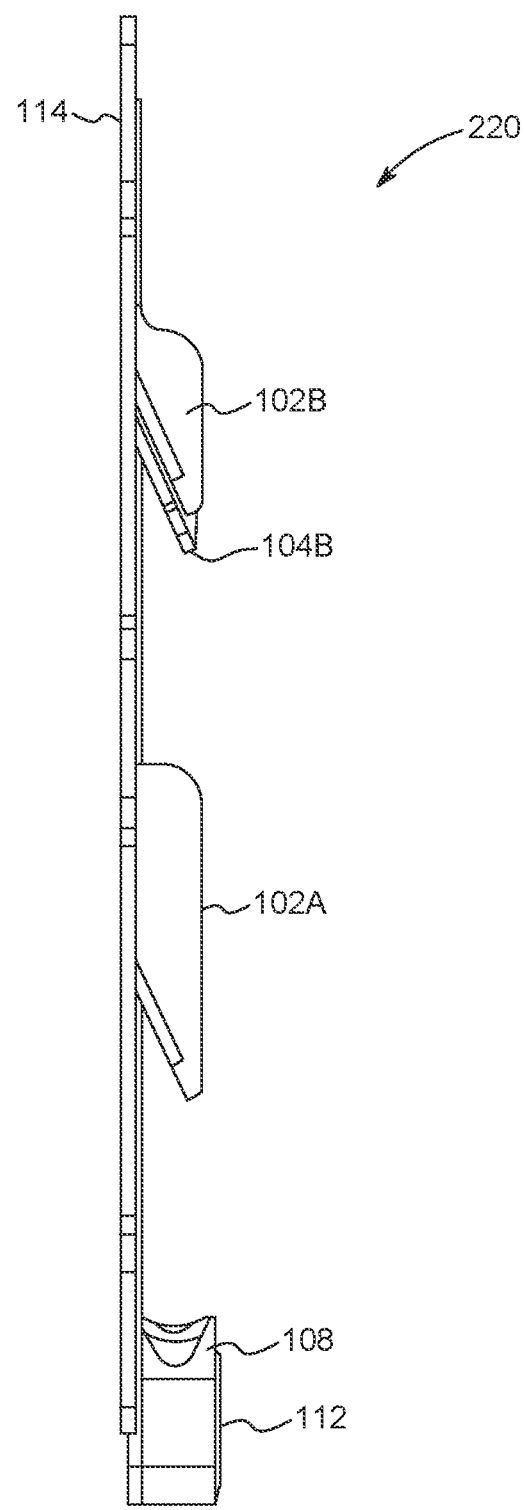
FIG. 2C illustrates a top view of the container bracket shown in FIG. 1A.

FIG. 2C illustrates top view 220 of the container bracket shown in FIG. 1A. As shown, cam lever 108 is arranged to rotate clockwise and counter-clockwise around axle 112. Further, the bottoms of upper ramp shaped elements of attachment devices 102A and 102B and lower ramp shaped elements of attachment devices 104A and 104B are shown.

Figure 2D:
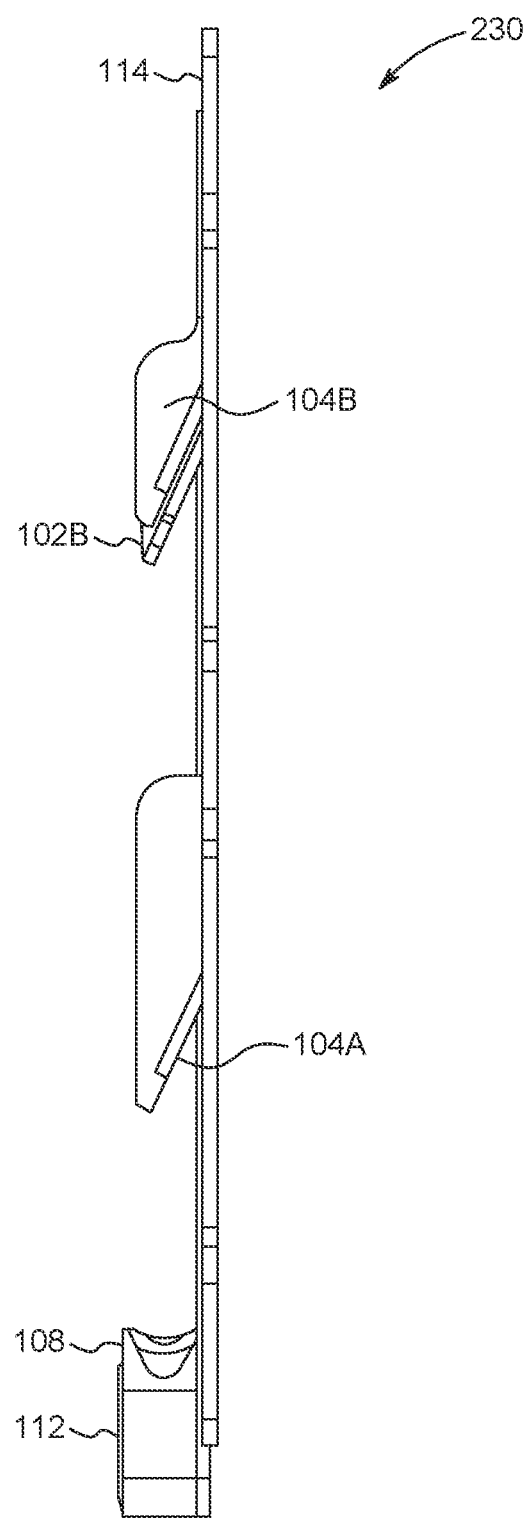
FIG. 2D illustrates a bottom view of the container bracket shown in FIG. 1A.

FIG. 2D illustrates bottom view 230 of the container bracket shown in FIG. 1A. As shown, cam lever 108 is arranged to rotate clockwise and counter-clockwise around axle 112. Further, the bottoms of upper ramp shaped elements of attachment devices 102A and 102B and lower ramp shaped elements of attachment devices 104A and 104B are shown.

Figure 3A:
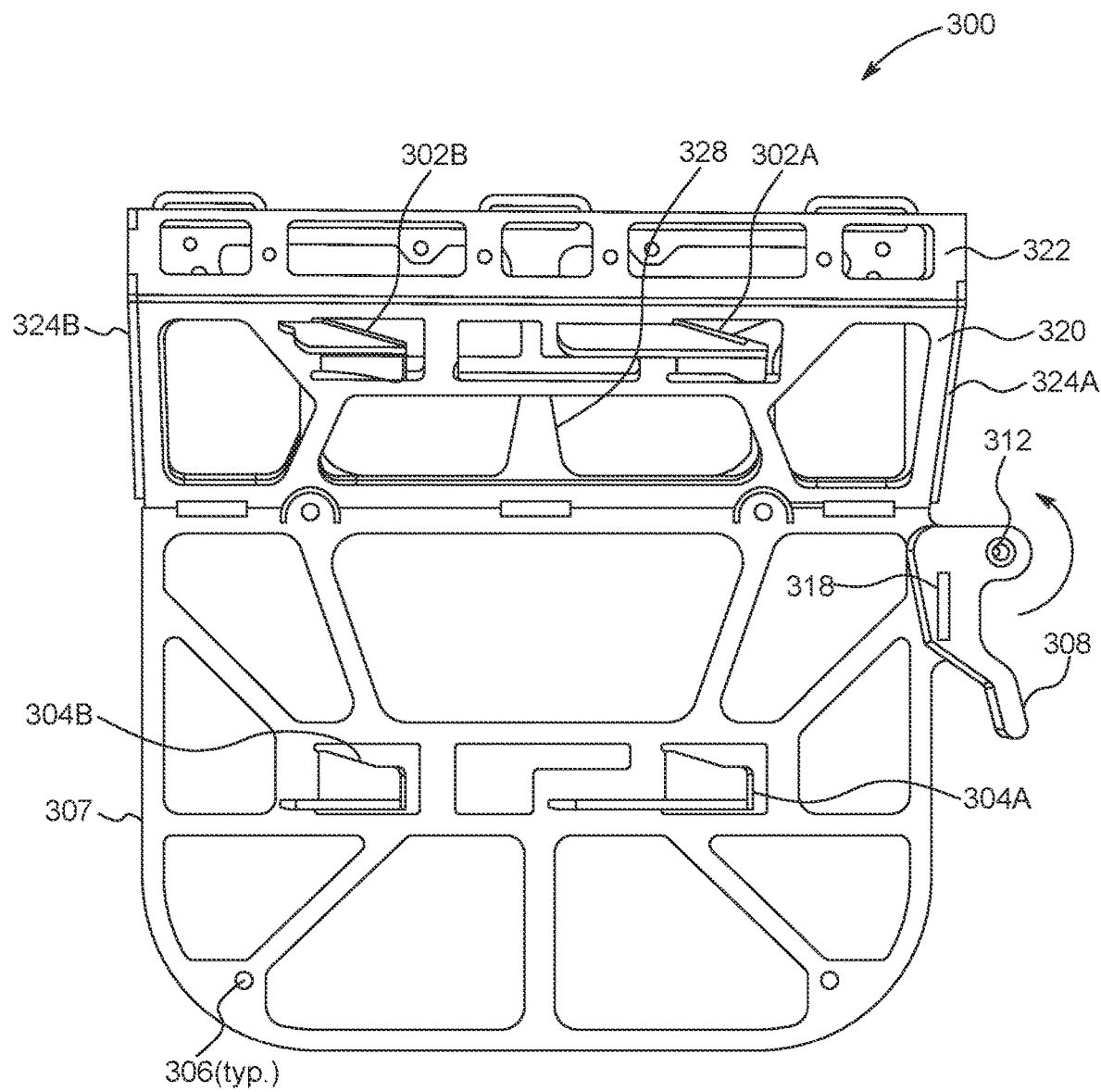
FIG. 3A shows a planar view of a front side for another type of container bracket with ports configured for fastening a container and employing multiple ramp shaped elements of attachment devices to attach to a chassis bracket on a side of a two wheeled vehicle.

FIG. 3A shows planar front view 300 for another embodiment of another container bracket with a plurality of ports 306 configured for fastening a rear side of the other container bracket to a container and multiple ramp shaped elements of attachment devices for attaching a front side of the other container bracket to another chassis bracket having a non-planar shape facing towards the front side of the other container bracket. The front side of the other container bracket is formed with six separate sub-surfaces, which are configured to arrange the front side of the other container bracket with another non-planar shape that accommodates the non-planar shape of the chassis bracket. The separate sub-surfaces 307, 320, 322, 328, 324A and 324B are arranged to form with the other non-planar shape of the front side of the other container bracket. Also, ports 306 are arranged on a portion of the sub-surfaces to enable a plurality of fastening devices to fasten a container (not shown) to the other container bracket.

Also, the arrangement of the plurality of sub-surfaces are positioned to evenly distribute the weight of a container (fastened to the sub-surfaces) and one or more externally applied forces, e.g., rotational, vertical and/or horizontal forces that can occur during normal operation of the two wheeled vehicle or an unexpected event.

Upper ramp shaped elements of attachment devices 302A and 302B are arranged to provide for removable attachment and un-attachment of the container bracket to a chassis bracket (not shown) that is adapted for attachment to a side of a two wheeled vehicle.

Lower ramp shaped elements of attachment devices 304A and 304B are arranged to provide for removable attachment and un-attachment of the container bracket to a chassis bracket (not shown) that is adapted for attachment to a side of a two wheeled vehicle. Also, the lower and or upper attachment devices may be initially configured and/or adjustably configured (not shown) to removably attach to a wide variety of a plurality of components on different chassis brackets separately provided by third parties.

Cam shaped lever 308 is configured to rotate around axle 312. Also, security device 318 is arranged to control clockwise rotation and/or counter-clockwise rotation of cam lever 308 around axle 312. Security device 318 may include one or more of a lock, keyed lock, pin, bolt, detent, bracket, spring, clasp, handle, washer, or the like.

Figure 3B:
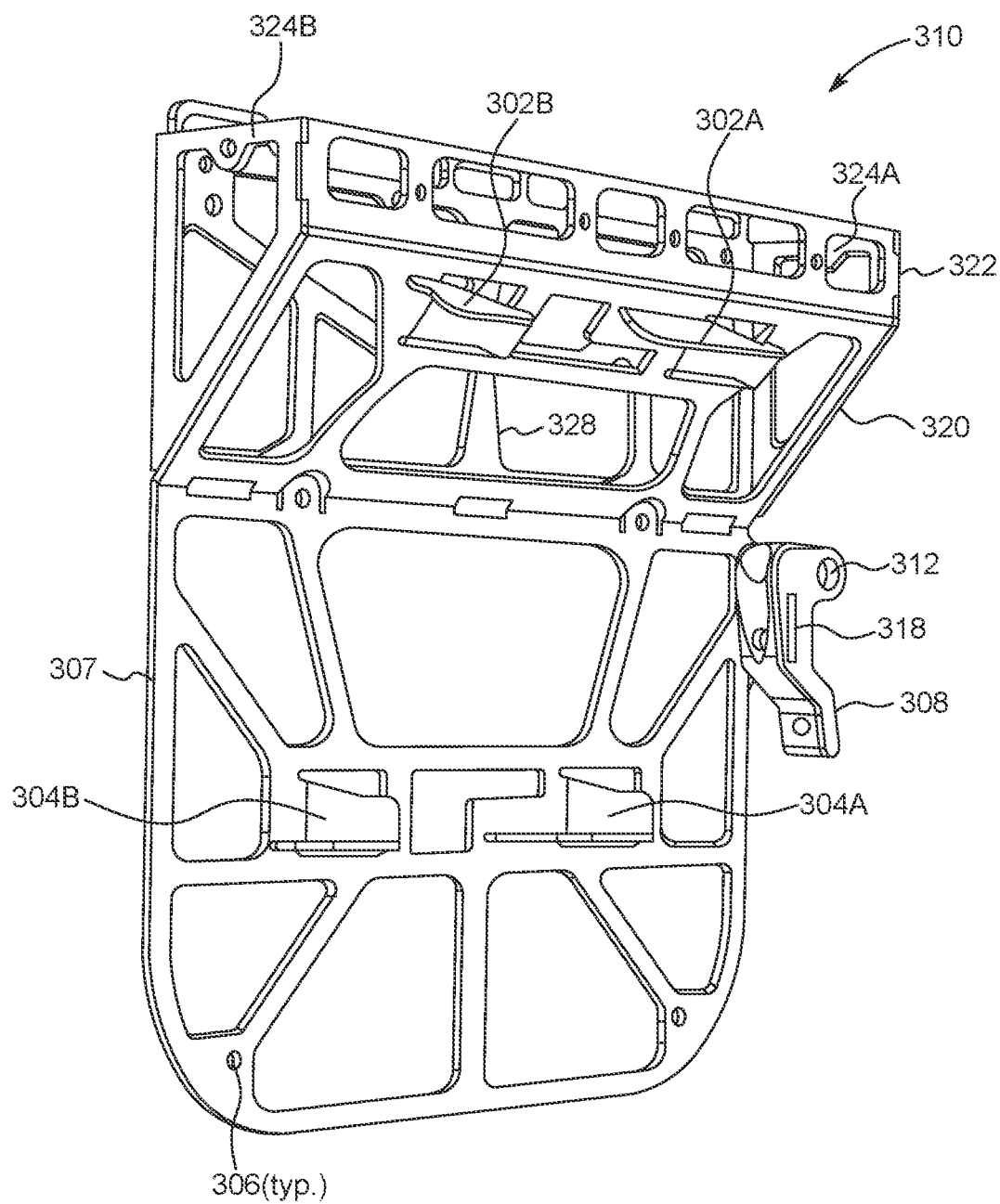
FIG. 3B illustrates a perspective view of the front planar view of the other container bracket shown in FIG. 3A.

FIG. 3B illustrates perspective front view 310 of the other container bracket shown in FIG. 3A. As shown, cam lever 308 is arranged to rotate clockwise and counter-clockwise around axle 312. Security device 318 is arranged to control clockwise rotation and/or counter-clockwise rotation of cam lever 308 around axle 312. Also, ports 306 are arranged on sub-surfaces 307 and 328 to enable a plurality of fastening devices to fasten a container (not shown) to the other container bracket. Further, the front side of upper ramp shaped elements of attachment devices 302A and 302B and lower ramp shaped elements of attachment devices 304A and 304B are shown.

Figure 3C:
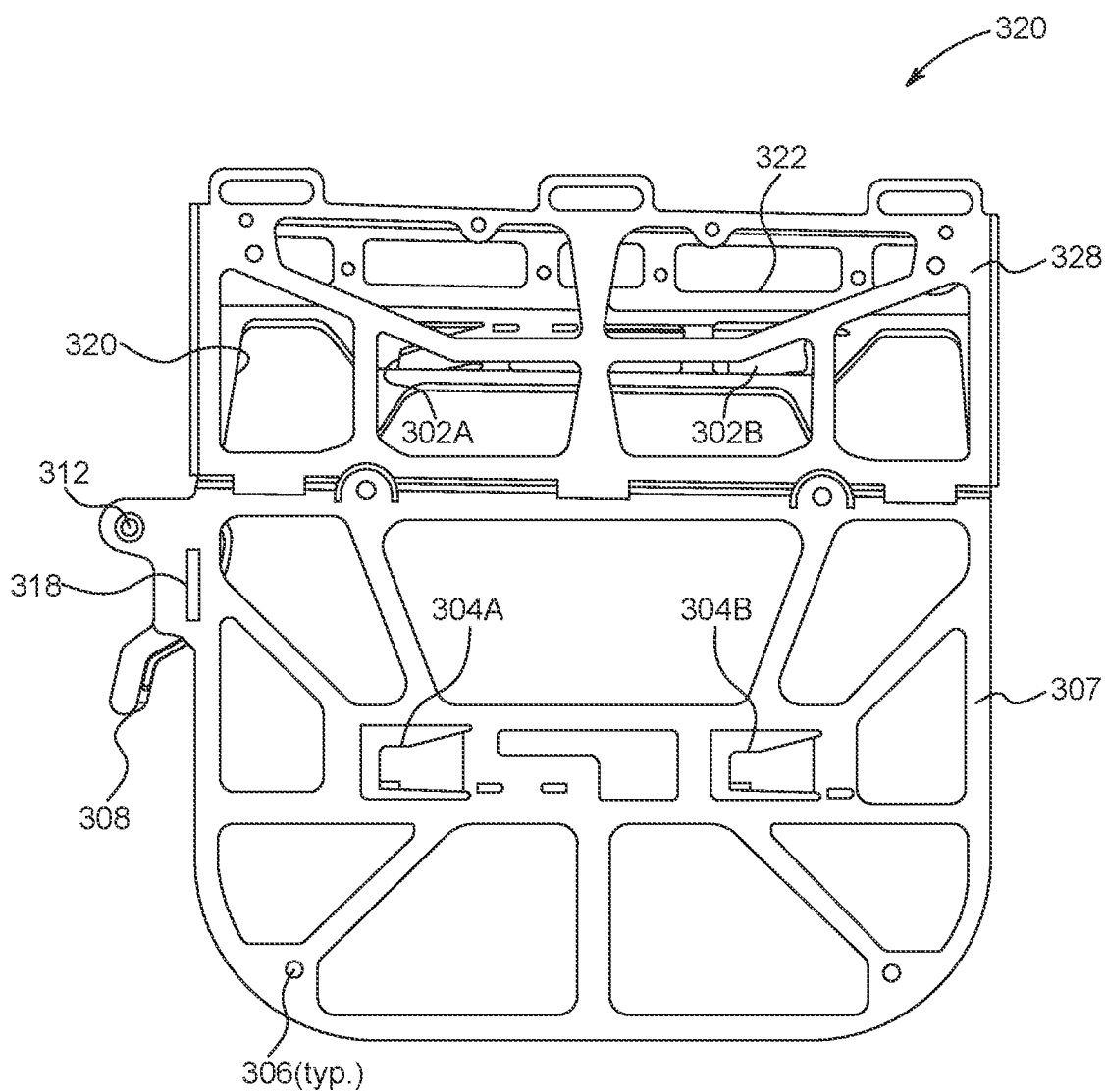
FIG. 3C shows a perspective view of a rear side of the other container bracket shown in FIG. 3A.

FIG. 3C shows planar rear view 320 of the other container bracket shown in FIG. 3A. As shown, cam lever 308 is arranged to rotate clockwise and counter-clockwise around axle 312. Security device 318 is arranged to control clockwise rotation and/or counter-clockwise rotation of cam lever 308 around axle 312. Also, ports 306 are arranged on sub-surfaces 307 and 328 to enable a plurality of fastening devices to fasten a container (not shown) to the other container bracket. Further, the front side of upper ramp shaped elements of attachment devices 302A and 302B and lower ramp shaped elements of attachment devices 304A and 304B are shown.

Figure 3D:
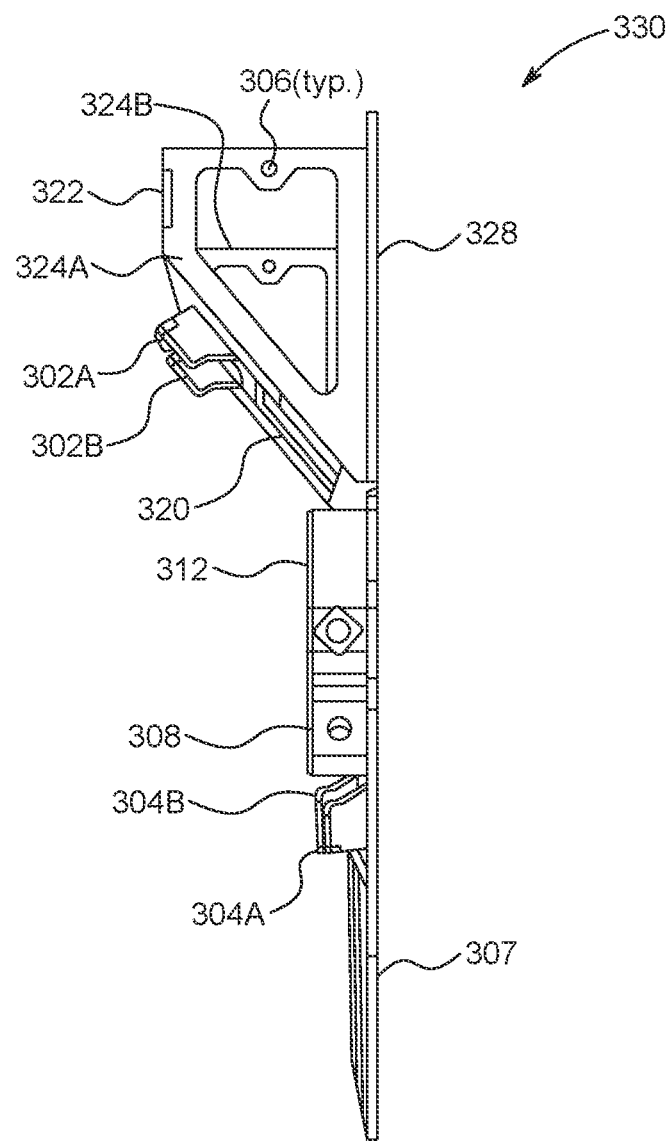
FIG. 3D illustrates a side view of the other container bracket shown in FIG. 3A.

FIG. 3D illustrates side view 330 of the other container bracket shown in FIG. 3A. As shown, cam lever 308 is arranged to rotate clockwise and counter-clockwise around axle 312. Also, sub-surfaces 307, 320, 322, 324A, 324B, and 328 are shown. Further, a side view of upper ramp shaped elements of attachment devices 302A and 302B and lower ramp shaped elements of attachment devices 304A and 304B are shown.

Figure 3E:
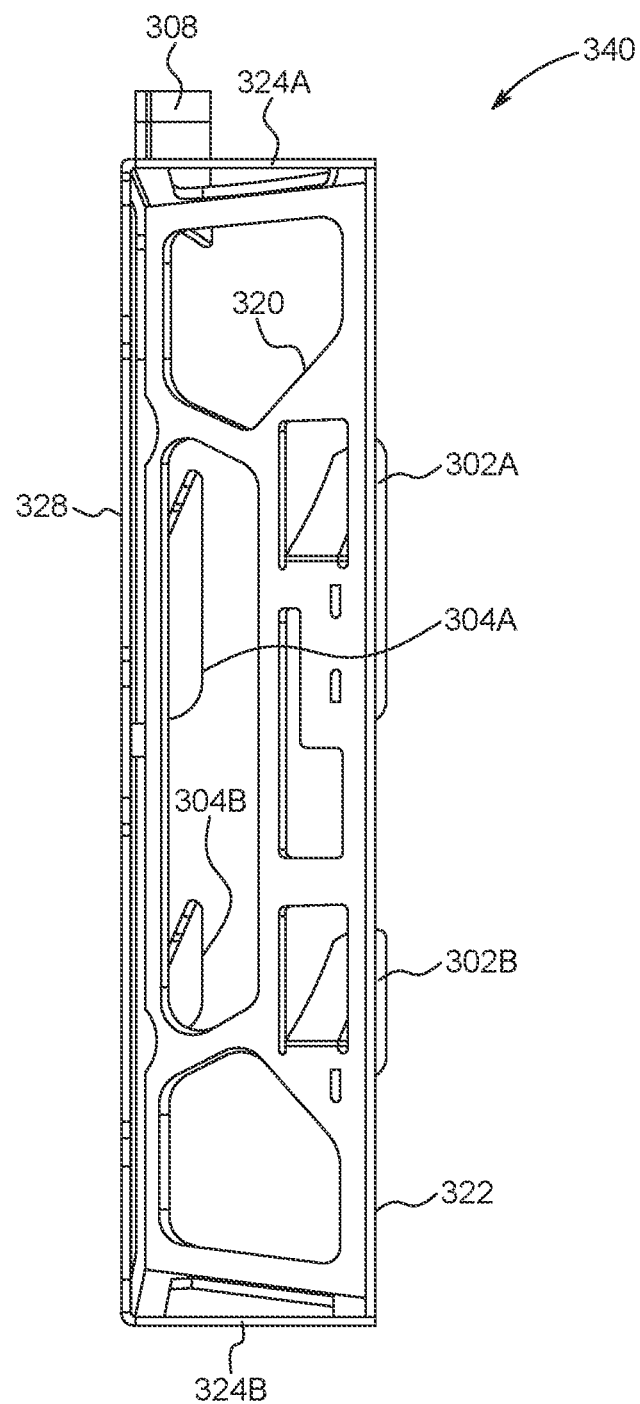
FIG. 3E shows a top view of the other container bracket shown in FIG. 3A.

FIG. 3E shows top view 340 of the other container bracket shown in FIG. 3A. As shown, cam lever 308 is configured to rotate clockwise and counter-clockwise around an axle. Sub-surfaces 320, 322, 328, 324A and 324B are shown. Further, the top side of upper ramp shaped elements of attachment devices 302A and 302B and lower ramp shaped elements of attachment devices 304A and 304B are shown.

Figure 3F:
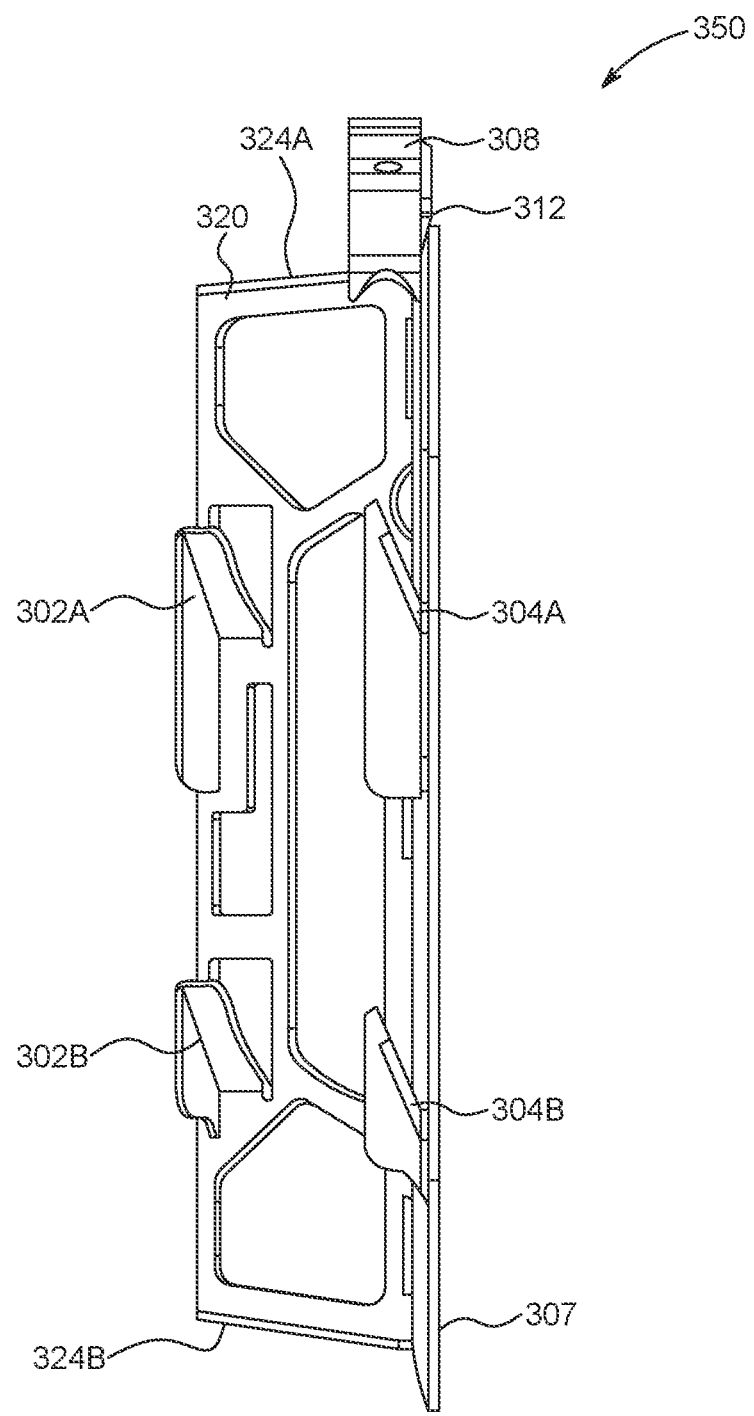
FIG. 3F illustrates a bottom view of the other container bracket shown in FIG. 3A.

FIG. 3F illustrates bottom view 350 of the other container bracket shown in FIG. 3A. As shown, cam lever 308 is configured to rotate clockwise and counter-clockwise around axle 312. Sub-surfaces 307, 320, 324A and 324B are shown. Further, the bottom side of upper ramp shaped elements of attachment devices 302A and 302B and lower ramp shaped elements of attachment devices 304A and 304B are shown.

Figure 3G:
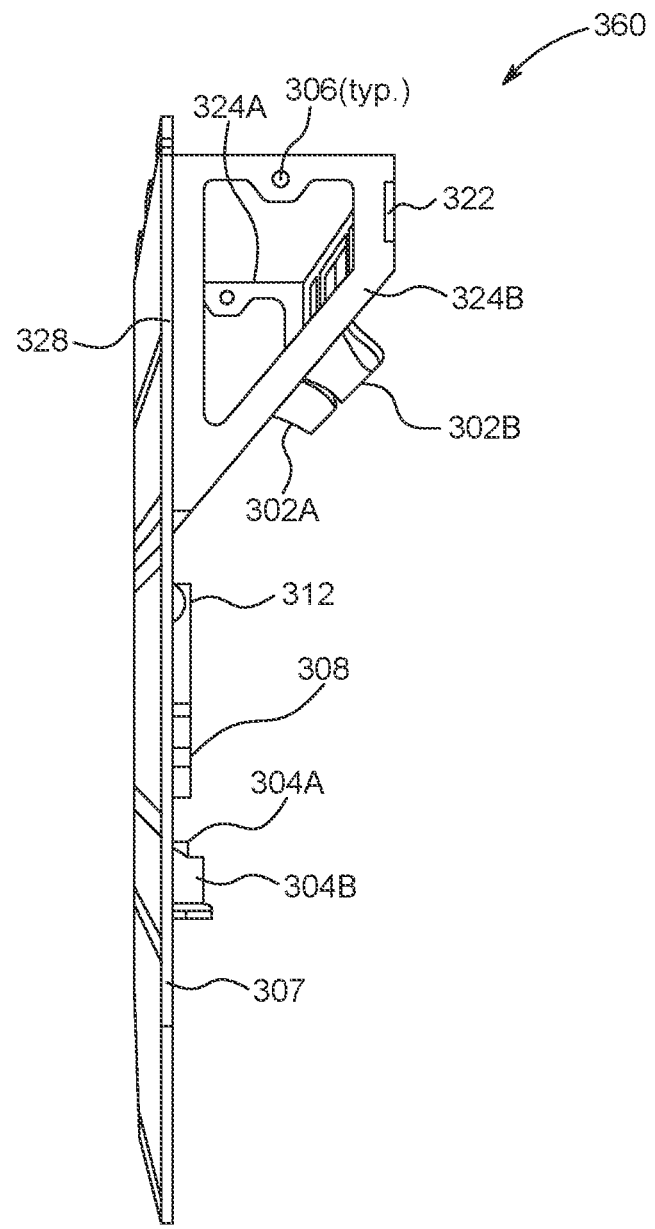
FIG. 3G shows a side view of the other container bracket shown in FIG. 3A.

FIG. 3G shows another side view 360 of the other container bracket shown in FIG. 3A. As shown, cam lever 308 is arranged to rotate clockwise and counter-clockwise around axle 312. Also, sub-surfaces 307, 322, 324A and 328 are shown. Further, a side view of upper ramp shaped elements of attachment devices 302A and 302B and lower ramp shaped elements of attachment devices 304A and 304B are shown.

Figure 4A:
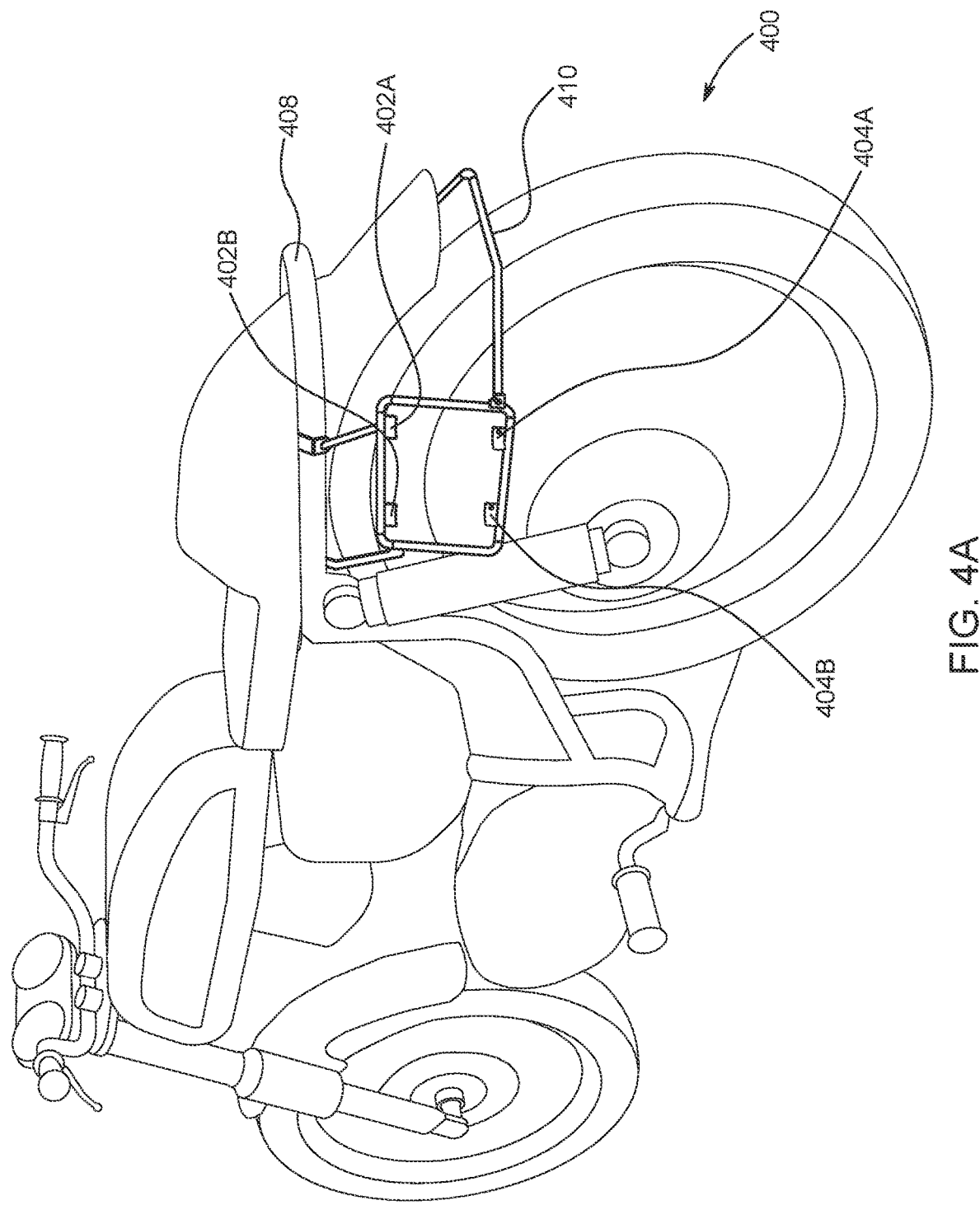
FIG. 4A illustrates a schematic sideview of a chassis bracket fastened to a two wheeled motorcycle and adapted for attachment to the container bracket shown in FIG. 1A.

FIG. 4A illustrates a schematic sideview 400 of chassis bracket 410 fastened to chassis element 408 on a side of a two wheeled motorcycle. Further, components 402A, 402B, 404A and 404B of chassis bracket 410 are configured for removable attachment to corresponding upper ramp shaped elements of attachment devices 102A and 102B and lower ramp shaped elements of attachment devices 104A and 104B of the container bracket shown in FIG. 1A.

Figure 4B:
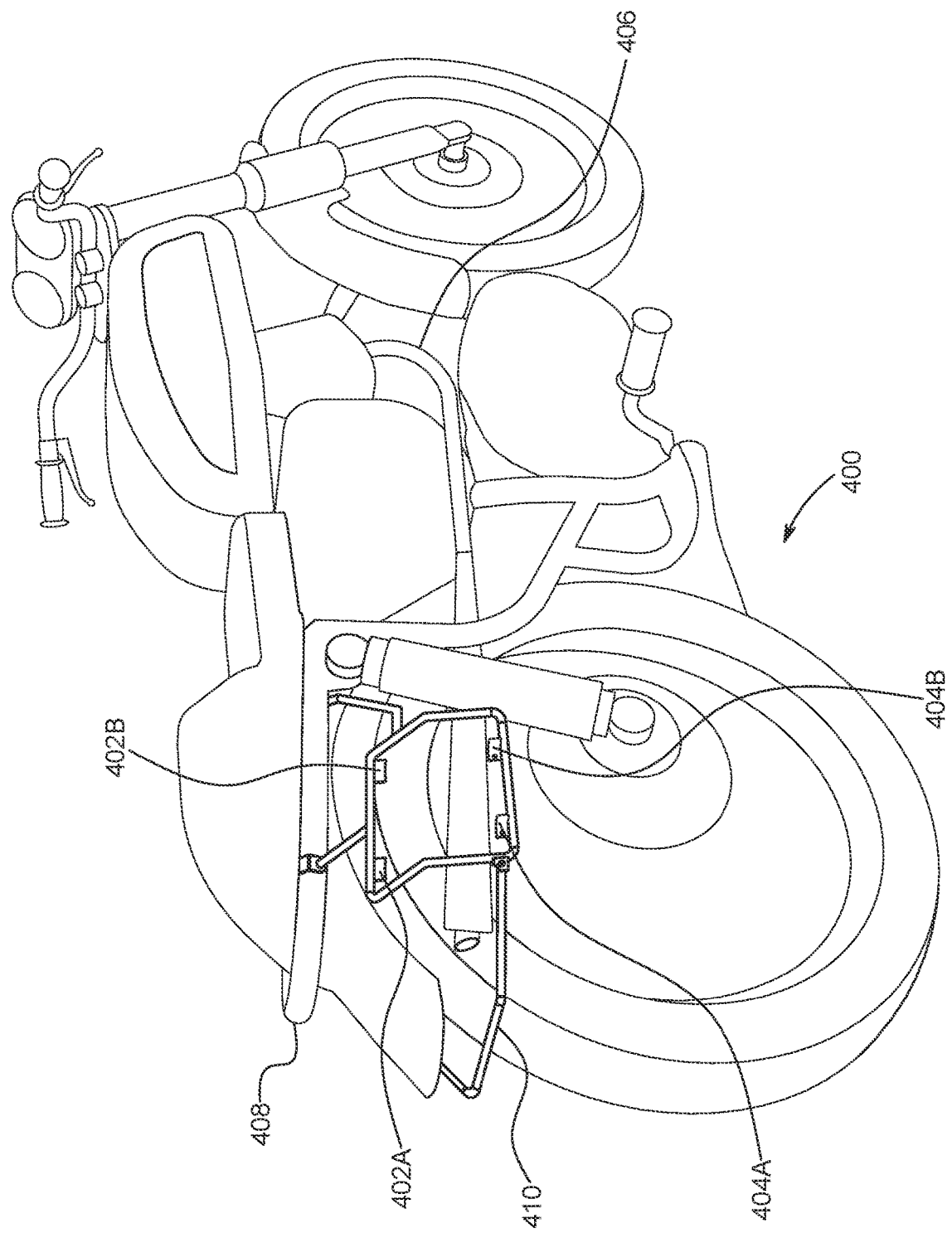
FIG. 4B shows a schematic sideview of a chassis bracket fastened to a motorcycle and configured to attach to another type of container bracket as shown in FIG. 3A.

FIG. 4B shows another schematic sideview 400 of chassis bracket 410 fastened to chassis element 408 on an opposite side of the two wheeled motorcycle shown in FIG. 4A. This portion of chassis bracket 410 is configured in a particular shape to accommodate a routing of exhaust pipe 406 behind the chassis bracket. Further, components 402A, 402B, 404A and 404B of chassis bracket 410 are configured for removable attachment to corresponding upper ramp shaped elements of attachment devices 302A and 302B and lower ramp shaped elements of attachment devices 304A and 304B of the container bracket shown in FIG. 3A.

Figure 4C:
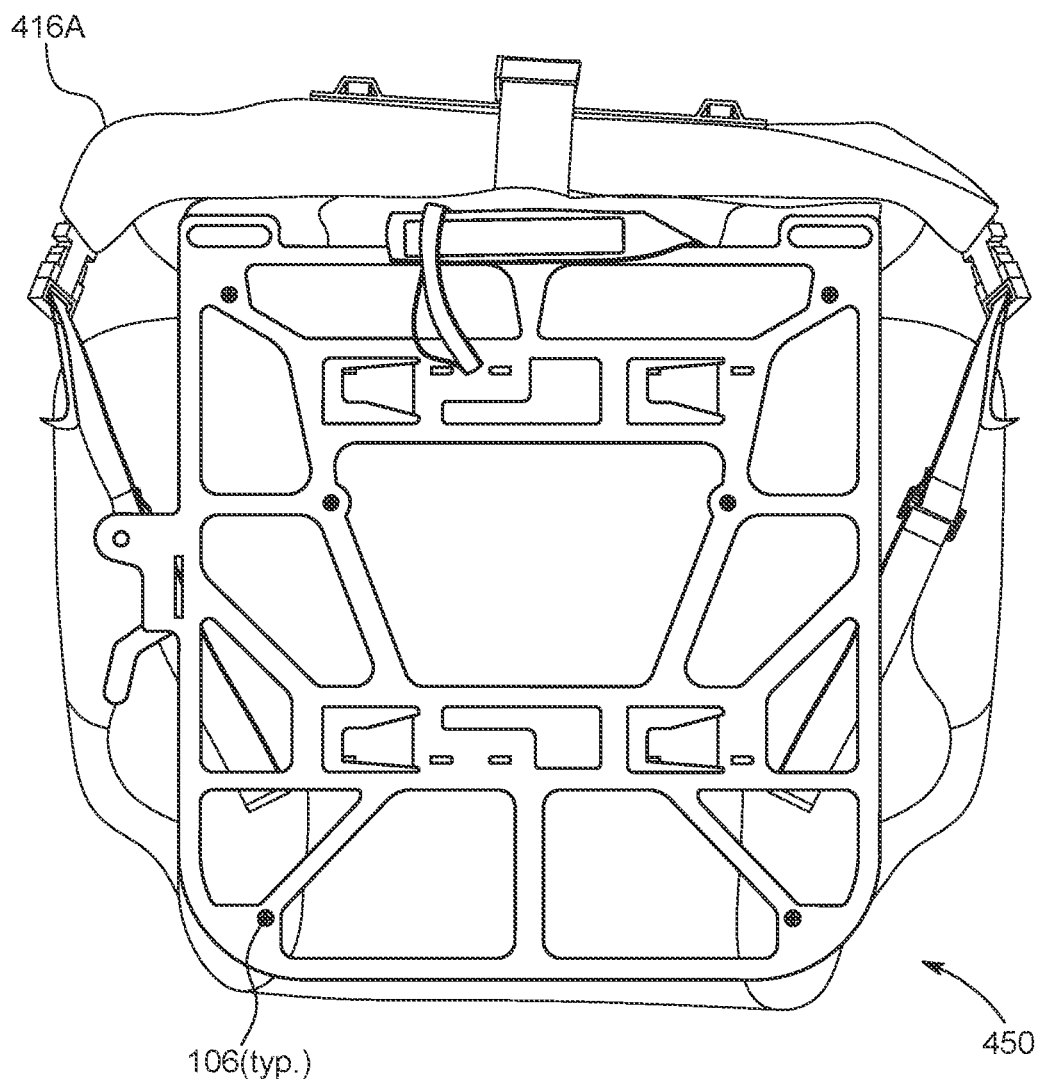
FIG. 4C illustrates a schematic view of a container fastened to a container bracket as shown in FIG. 1A.

FIG. 4C illustrates a schematic view 450 of container 416A fastened by a plurality of fastening devices through a plurality of ports 106 to a container bracket as shown in FIG. 1A.

Figure 4D:
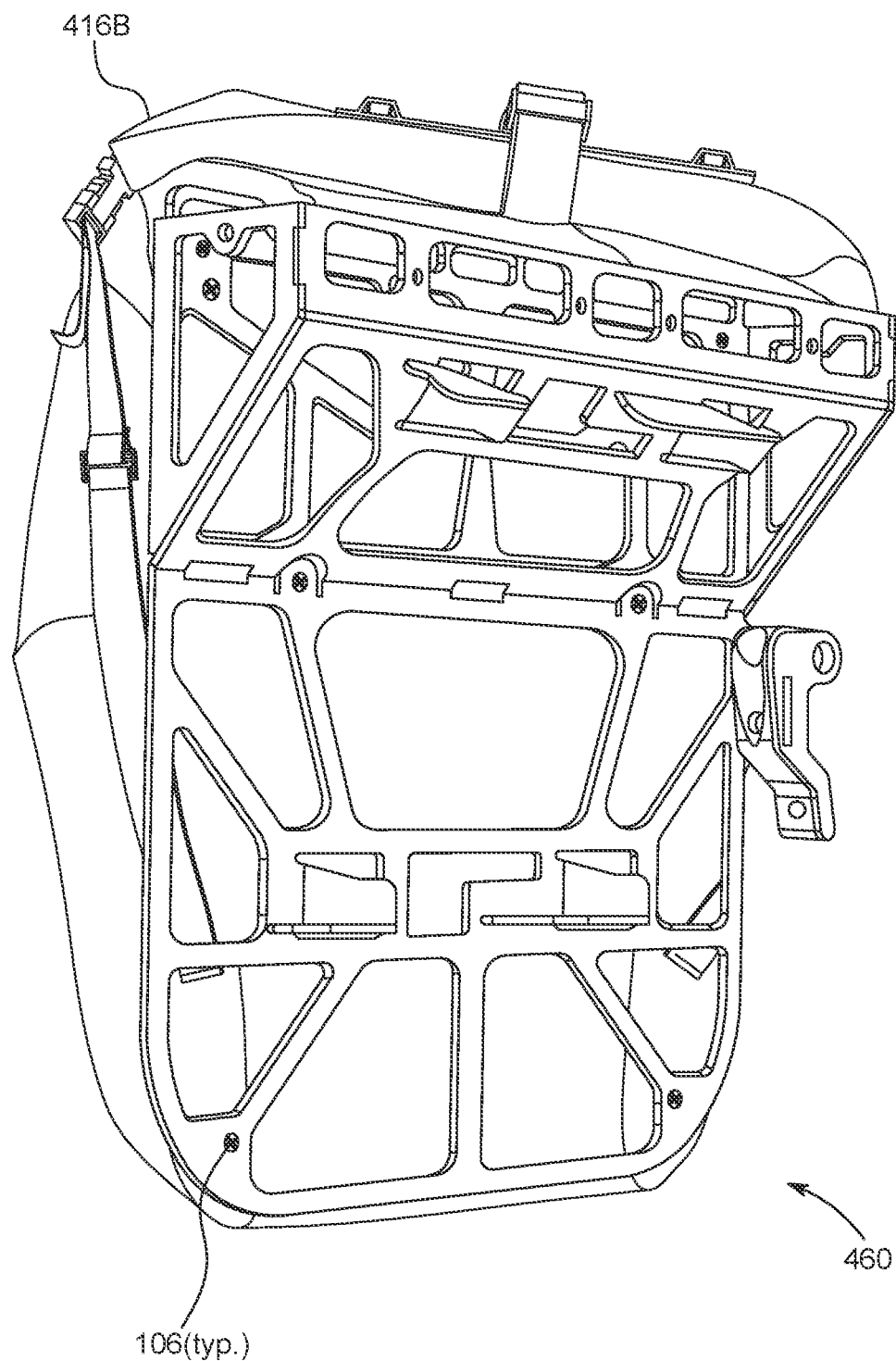
FIG. 4D shows a schematic view of a container fastened to another type of container bracket as shown in FIG. 3A.

FIG. 4D shows another schematic view 460 of container 416B fastened through a plurality of ports to another type of container bracket as shown in FIG. 3A.

The foregoing exemplary embodiments should not be construed as limiting or exhaustive, but rather, illustrative use cases to show an implementation of at least one of the various embodiments.

What is claimed as new and desired to be protected by Letters Patent of the United States is:

1. An apparatus adapted for attaching to a two wheeled vehicle, comprising:
   a container bracket having a planar shape, wherein a planar rear side of the container bracket includes a plurality of ports that are adapted for a plurality of fastener devices to permanently attach the container bracket to a side of a container;
   a plurality of attachment devices that are positioned in separate portions of a planar front side of the container bracket, wherein the plurality of attachment devices are adapted for attaching to a plurality of components of a chassis bracket that is fastened to a side of a chassis of the two wheeled vehicle;
   one or more engagement devices fastened to the container bracket, wherein activation of the one or more engagement devices causes a horizontal sliding motion for the container bracket along the side of the chassis and towards a rear of the chassis of the two wheeled vehicle when it is pressed against the chassis bracket to attach the plurality of attachment devices to the plurality of components of the chassis bracket, and wherein the attachment of the container bracket to the chassis bracket provides for attachment of the container to the side of the two wheeled vehicle;
   a plurality of internal sections that are included in the container bracket, wherein the plurality of internal sections are formed having a plurality of removed pieces and arranged to evenly distribute both a weight of the container fastened to the container bracket and one or more externally applied forces that are applied in one or more of a vertical direction, a horizontal direction or a diagonal direction to the container and the container bracket; and
   wherein the plurality of ports adapted for the plurality of fastener devices are arranged in positions on the plurality of internal sections of the container bracket for the even distribution of both the weight of the container and the one or more external forces applied to the container bracket, the plurality of internal sections, and the container during collision of the container with one or more of a stationary object or a stationary surface while the container is attached to the side of the two wheeled vehicle; and
   an other container bracket, wherein a planar shape of a rear side of the other container bracket includes another plurality of ports that are adapted for another plurality of fastener devices to permanently attach the container bracket to a side of a container, and wherein a non-planar shape of a front side of the other container bracket includes a plurality of separate sections that are arranged as a plurality of sub-surfaces that form the non-planar front side of the container bracket, and wherein the non-planar shape of the front side of the other container bracket is arranged to accommodate attachment to a non-planar shape of an other chassis bracket.

2. The apparatus of claim 1, wherein activation of the one or more engagement devices further comprises:
   applying the sliding motion for the container bracket towards a rear of the two wheeled vehicle to attach the plurality of attachment devices from the plurality of components of the chassis bracket.

3. The apparatus of claim 1, further comprising:
   wherein de-activation of the one or more engagement device causes a sliding motion towards a front of the two wheeled vehicle for the container bracket when it is pressed against the chassis bracket to detach the plurality of attachment devices from the plurality of components of the chassis bracket.

4. The apparatus of claim 1, wherein attachment of the plurality of attachment devices to the plurality of components further comprises:
   employing the plurality of attachment devices to progressively apply a wedging force against each component of the chassis bracket during the sliding motion caused by activation of the one or more engagement devices, and wherein the wedging force is progressively de-applied in a reversed sliding motion during the de-activation of the one or more engagement devices.

5. The apparatus of claim 1, wherein the plurality of attachment devices, further comprise:
   a plurality of elements that include one or more of a ramp shaped element, a hook shaped element, or a contour shaped element for engaging one or more of the plurality of components of the chassis bracket, wherein one or more of the plurality of attachment devices are adjustable to accommodate attachment to one or more of a plurality of other components on other chassis brackets that are fastened to the two wheeled vehicle.

6. The apparatus of claim 1, further comprising:
   one or more portions of the container bracket are comprised of one or more materials that retain a shape memory of the container bracket in response to an external force that causes a change in an original shape of the one or more portions of the container bracket, wherein the one or more portions of the container bracket comprised of the one or more shape memory materials automatically return to their original shape when the external force is non-applied.

7. The apparatus of claim 1, further comprising:
   one or more portions of the container bracket are comprised of one or more of a metallic material or a non-metallic material that consists of one or more members of steel, alloy metal, aluminum, nitinol, fiberglass, polymer, ceramic, plastic, carbon fiber, or composite.

8. The apparatus of claim 1, wherein the one or more engagement devices consist of one or more members of:
   a cam, a solenoid, an actuator, a spring, a coil, a lever, a hydraulic component, an air component, a mechanical device, an electric device, an electronic device, or an electro-mechanical device.

9. The apparatus of claim 1, further comprising:
   a plurality of ports connecting a top planar surface to a bottom planar surface of the container bracket, wherein the plurality of ports are configured for a plurality of fasteners to fasten a side of the container to the top planar surface of the bracket.

10. The apparatus of claim 1, further comprising:
    a plurality of fastener devices adapted for fastening the container bracket to the container, wherein the plurality of fastener devices consist of one or more members of a bolt, rivet, screw, stud, peg, button, snap, tack, latch, clip, clasp, peg, pinion, clamp, anchor, tape, staple, tether, tie, chain, shackle, hook and loop fastener, adhesive, or weld.

11. The apparatus of claim 1, further comprising:
    a security device that is configured to control one or more of activation or de-activation of the one or more engagement devices, wherein the security device consists of at least one or more members of a lock, a keyed lock, a pin, a bolt, a detent, a bracket, a spring, a handle, a clasp, a lever, a keypad, a push button, a biometric sensor, a video camera, a wireless local area network component, wireless pico area network component or a wireless nano area network component.

12. The apparatus of claim 1, wherein the planar shape of the container bracket further comprises:
one of a rectilinear, curved, or asymmetric shape that is configured to accommodate fastening to a planar shape of the side of the container.

13. The apparatus of claim 1, wherein the activation of one or more engagement devices, further comprises:
applying another sliding motion in one or more of a vertical direction, or a diagonal direction that is oriented in reference to one or more of a front, a top or a bottom of the two wheeled vehicle.

14. The apparatus of claim 1, further comprising:
de-activating the one or more engagement devices causes another sliding motion for the container bracket in one or more of a vertical direction, a horizontal direction, or a diagonal direction that is oriented in reference to one or more of a front, a top or a bottom of the two wheeled vehicle.

15. A system adapted for attaching to a two wheeled vehicle, comprising:
a container bracket having a planar shape, wherein a planar rear side of the container bracket includes a plurality of ports that are adapted for a plurality of fastener devices to permanently attach the container bracket to a side of a container, and wherein a planar front side of the container bracket includes a plurality of attachment devices that are positioned in separate portions of the planar front side;
a chassis bracket that is fastened to a side of a chassis of the two wheeled vehicle, wherein the chassis bracket includes a plurality of components that are configured for attachment to the plurality of attachment devices;
one or more engagement devices fastened to the container bracket, wherein activation of the one or more engagement devices causes a horizontal sliding motion for the container bracket along the side of the chassis and towards a rear of the chassis of the two wheeled vehicle when it is pressed against the chassis bracket to attach the plurality of attachment devices to the plurality of components of the chassis bracket, and wherein the attachment of the container bracket to the chassis bracket provides for attachment of the container to the side of the two wheeled vehicle;
a plurality of internal sections that are included in the container bracket, wherein the plurality of internal sections are formed having a plurality of removed pieces and arranged to evenly distribute both a weight of the container fastened to the container bracket and one or more externally applied forces that are applied in one or more of a vertical direction, a horizontal direction or a diagonal direction to the container and the container bracket; and
wherein the plurality of ports adapted for the plurality of fastener devices are arranged in positions on the plurality of internal sections of the container bracket for the even distribution of both the weight of the container and the one or more external forces applied to the container bracket, the plurality of internal sections, and the container during collision of the container with one or more of a stationary object or a stationary surface while the container is attached to the side of the two wheeled vehicle; and
an other container bracket, wherein a planar shape of a rear side of the other container bracket includes another plurality of ports that are adapted for another plurality of fastener devices to permanently attach the container bracket to a side of a container, and wherein a non-planar shape of a front side of the other container bracket includes a plurality of separate sections that are arranged as a plurality of sub-surfaces that form the non-planar front side of the container bracket, and wherein the non-planar shape of the front side of the other container bracket is arranged to accommodate attachment to a non-planar shape of an other chassis bracket.

16. The system of claim 15, wherein the activation of one or more engagement devices, further comprises:
applying another sliding motion in one or more of a vertical direction, or a diagonal direction that is oriented in reference to one or more of a front, a top or a bottom of the two wheeled vehicle.

17. The system of claim 15, further comprising:
de-activating the one or more engagement devices causes another sliding motion for the container bracket in one or more of a vertical direction, a horizontal direction, or a diagonal direction that is oriented in reference to one or more of a front, a top or a bottom of the two wheeled vehicle.

18. The system of claim 15, wherein the plurality of attachment devices, further comprise:
a plurality of elements that consist of at least one or more members of a ramp shaped element, a hook shaped element, or a contour shaped element for engaging one or more of the plurality of components of the chassis bracket, wherein one or more of the plurality of attachment devices are adjustable to accommodate attachment to one or more of a plurality of other components on other chassis brackets that are fastened to the two wheeled vehicle.

19. The system of claim 15, further comprising:
a security device that is configured to control one or more of activation or de-activation of the one or more engagement devices, wherein the security device consists of one or more members of a lock, a keyed lock, a pin, a bolt, a detent, a bracket, a spring, a handle, a clasp, a lever, a keypad, a push button, a biometric sensor, a video camera a wireless local area network component, a wireless pico network component, or a wireless nano network component.

20. The system of claim 15, wherein the one or more engagement devices further consist of one or more members of:
a cam, a solenoid, an actuator, a spring, a coil, a lever, a hydraulic component, an air component, a mechanical device, an electric device, an electronic device, or an electro-mechanical device.

* * * * *